(12) United States Patent
Johansson et al.

(10) Patent No.: US 6,833,091 B1
(45) Date of Patent: Dec. 21, 2004

US006833091B1

(54) METHOD FOR INJECTING OF FOAMED CONCRETE AND A FOAMED CONCRETE

(75) Inventors: Ingemar Johansson, Ange (SE); Kenth Imrell, Ange (SE); Kjell Svedman, Ange (SE)

(73) Assignee: SENAD Teknikbetong AB (SE)

( * ) Notice: Subject to any disclaimer, the term of this patent is extended or adjusted under 35 U.S.C. 154(b) by 0 days.

(21) Appl. No.: 09/600,343

(22) PCT Filed: Jan. 15, 1999

(86) PCT No.: PCT/SE99/00047
§ 371 (c)(1),
(2), (4) Date: Aug. 15, 2000

(87) PCT Pub. No.: WO99/36665
PCT Pub. Date: Jul. 22, 1999

(30) Foreign Application Priority Data

Jan. 16, 1998 (SE) ............................................ 9800082

(51) Int. Cl.$^7$ ........................... E02D 3/12; E02D 37/00; C09K 17/40; C09K 17/44; C09K 17/48
(52) U.S. Cl. ................. 264/35; 264/36.2; 264/42; 405/266; 405/267; 166/293; 166/294; 166/295; 106/672; 106/677; 106/679; 106/681
(58) Field of Search .................... 264/35, 36.2, 42; 166/293, 294, 295; 106/672, 677, 679, 681; 405/266, 267

(56) References Cited

U.S. PATENT DOCUMENTS

| | | | | |
|---|---|---|---|---|
| 3,844,351 A | * | 10/1974 | Sutton et al. | 166/293 |
| 4,058,405 A | * | 11/1977 | Snyder et al. | 106/641 |
| 4,141,744 A | * | 2/1979 | Prior et al. | 106/617 |
| 4,168,985 A | * | 9/1979 | Kolar et al. | 106/717 |
| 4,309,129 A | * | 1/1982 | Takahashi | 405/269 |
| 4,340,427 A | * | 7/1982 | Sutton | 106/641 |
| 4,466,833 A | * | 8/1984 | Spangle | 106/602 |
| 4,514,112 A | * | 4/1985 | Sano et al. | 405/269 |
| 5,160,540 A | * | 11/1992 | Johansson et al. | 106/672 |
| 5,728,209 A | * | 3/1998 | Bury et al. | 106/819 |
| 5,820,670 A | * | 10/1998 | Chatterji et al. | 106/737 |
| 6,022,407 A | * | 2/2000 | Stridh et al. | 106/678 |

* cited by examiner

Primary Examiner—Suzanne E. McDowell
Assistant Examiner—Michael I. Poe
(74) Attorney, Agent, or Firm—John Lezdey

(57) ABSTRACT

A method for stabilizing gravel, sand, crushed stone, rock and concrete structures which have cracks by injecting a pumpable, low viscous aqueous aerated concrete with a pore volume of at least 20% by volume into the cracks at a low pressure and then increasing the pressure so that the entrained air bubbles escape and sedimentation and hydration occur.

10 Claims, 1 Drawing Sheet

METHOD FOR INJECTING OF FOAMED CONCRETE AND A FOAMED CONCRETE

FIELD OF THE INVENTION

This invention relates to a method of stabilizing gravel, sand, crushed stone, rock and concrete structures which are cracked, porous or have other cavities difficult of access, and sealing the same against flows of water by injecting a pumpable, low-viscous aerated concrete which is based on an aqueous dispersion containing finely-ground cement, a dispersing agent and optionally fine-particulate material having a large specific surface.

BACKGROUND OF THE INVENTION

When stabilizing and sealing gravel, sand, rock and concrete structures, which are porous or cracked, or have other cavities difficult of access, it is generally known to inject pumpable, easy-flow concrete containing cement and frequently various additives, such as accelerators and retarders controlling the curing of the cement, and fine-particulate material promoting the sealing of the cavities. However, it has been found that in many cases it is difficult to achieve a satisfactory result. For instance, it has proved to be difficult to make the injected concrete reach sufficiently far into the narrow cavities to obtain a satisfactory seal against penetrating water. It has also been found to be difficult, in e.g. rock which conducts great amounts of water, to apply the concrete and make it cure before an increase of the water-cement ratio occurs and the concrete is wholly or partly flushed away.

SUMMARY OF THE INVENTION

According to the present invention, it has now been found possible to solve these problems and present an effective method of stabilizing and sealing gravel, sand, crushed stone, rock and concrete structures. The method is characterised by injecting aerated concrete with a pore volume of at least 20% by volume into the cavities that are difficult of access and are to be sealed. The injection should be carried out by first injecting the aerated concrete at such a low pressure that the aerated concrete remains intact, and then applying an increased pressure, such that the air bubbles located in or in the vicinity of the cavity are pressed further into the cavities and collapse, whereby air entrains cement and a fine-particulate material, if any, into the cavities, where sedimentation and hydration take place. The pressure when injecting the aerated concrete is suitably below 3 bar while the increased pressure usually is above 6 bar.

By applying the inventive method, it has been found possible to considerably reinforce the stabilization by the fact that the hydratable concrete mixture can penetrate further into the cracks than is possible when injecting a conventional concrete mixture. The cement is suitably finely ground to such a particle size that at least 95% pass a screen having a mash size or 64 $\mu$m, preferably 34 $\mu$m and most preferred 16 $\mu$m if penetration into fine cavities is desired. The air bubbles and the escape thereof through the cavities also prevent penetration of water during injection and thus prevent, at least partly, the fresh concrete from being diluted with water and make any flushing away difficult. If the flowing through of water is extremely great or if a low water permeability is desired, it has according to the invention been found to be suitable to use hydrophobic aerated concrete. Preferably the aerated concrete is hydrophobised to such an extent that it does not spontaneously mix with water. As a result, dilution of the mixture with water is avoided while at the same time the risk of flushing away is considerably reduced.

BRIEF DESCRIPTION OF THE DRAWINGS

The invention will now be described in more detail with reference to the drawing, in which.

Figure 1:
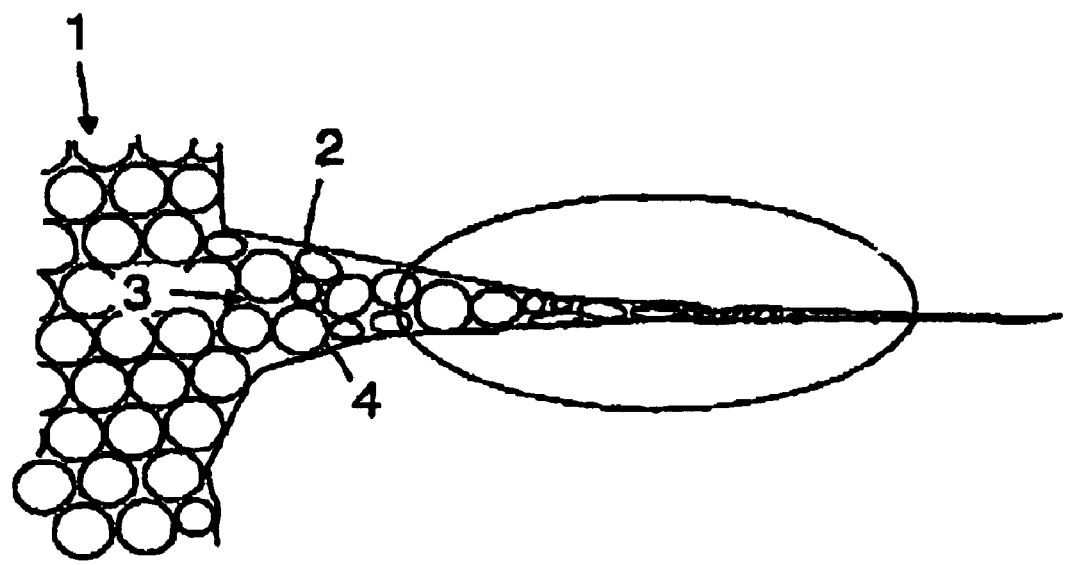
FIG. 1 illustrates the penetration of the fresh concrete into a crack.
Figure 2:
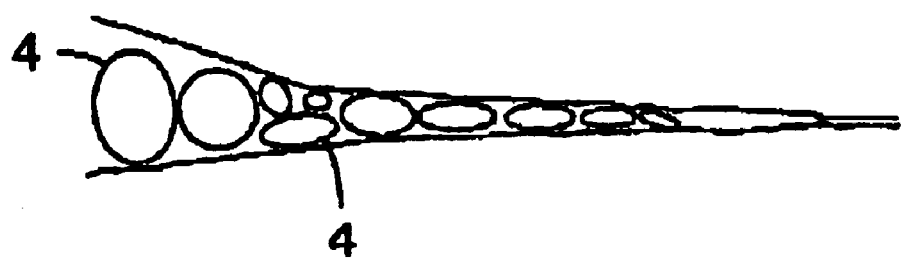
FIG. 2 is an enlarged picture of the encircled portion in FIG. 1.

The present invention also refers to low-viscous, pumpable aerated concrete, which is based on cement with such a particle size that 95% by weight pass a screen having a mesh size of 64 $\mu$m and a pore volume of at least 20% by volume. The aerated concrete suitably contains the following components:

100 parts by weight of cement, ground to such a particle size that 95% by weight pass a screen of the mesh size 64 $\mu$m, preferably 32 $\mu$m, 0.1–1 parts by weight of a dispersing agent, such as a protein, an anionic surfactant and/or a polymer, and 35–80 preferably 50–70 parts by weight of water, 0–10 parts by weight of a fine-particulate material with a particle size smaller than that of the cement, 0–2.5 parts by weight of a resin having a molecular weight below 10,000 and a saponification rate of 100–250, and 0–2.5 parts by weight of an accelerator, retarder and/or thickening agent which control the hydration of the cement or gradually increase the viscosity of the concrete, and 0–2 parts by weight of a swelling additive.

The pore volume of the aerated concrete is suitably between 40% and 85% and preferably between 50% and 80%. In connection with very narrow cavities, such as microcracks in rock, the concrete suitably contains 1–10 parts by weight of a fine-particulate material per 100 parts by weight of cement. If hydrophobic aerated concrete is desired, the hydrophobicity can be increased by adding rosin in an amount of 0.1–2.5 parts by weight per 100 parts by weight of cement and, optionally, fine-particulate bentonite in an amount of 0.1–3 parts by weight per 100 parts by weight of cement. The concrete usually has a density of 300–1800 kg/m$^2$, preferably 400–1500 kg/m$^2$.

DESCRIPTION OF THE PREFERRED EMBODIMENTS

Cement is a hydraulic binding agent which, with water, forms a paste and cures by hydration. The curing depends in the first place on thee formation of calcium silicate hydrate. The most important silicate-cement-containing composition is Portland cement clinker. When applying the invention use is preferably made of Portland cement owing to its excellent all-round properties. It contains, among other things, tricalcium silicate, dicalcium silicate, tricalcium aluminata and calcium aluminium ferrite. Other examples of suitable types of cement are Portland slag cement, Portland fly ash cement, Portland pozzolana cement, coloured Portland cement, white Portland cement, low heat Portland cement and rapid hardening Portland cement, which are all based on Portland cement clinker.

When using cement in injected concrete, it is convenient to grind cement additionally to such a particle size that at least 95% by weight pass a screen having a mash size of 32 $\mu$m, preferably 16 $\mu$m for the concrete to penetrate more easily into narrow cavities. If required owing to the circumstances, a still finer cement can be used.

The dispersing agents are added an air-pore-forming and stabilizing additives. Examples of such additives are proteins, nonionic alkylene oxide adducta, xylene sulphonate, alkyl sulphate, alkyl ether sulphate, olefin sulphate and polymer sulphonic-acid-group-containing compounds, such as lignosulphonaze, naphthalenesulphonate formaldehyde condensate and malamine sulphonate formaldehyde condensate and mixtures thereof. The proteins, the nonionic alkylene oxide adducts and the short-chain anionic compounds affect in the first place the formation of air pores while the polymer anionic polyelectrolytes primarily contribute to improve stability and pumpability.

Specially preferred dispersing agents are anionic surface-active disulphonates of the type described in patent application WO 97/39992, where the disulphonates are of the general formula

$$(R)_m\text{-}R_1\text{-}(SO_3M)_2 \quad (I)$$

wherein R is an aliphatic group having 4–20 carbon atoms, m is a number 1 or 2, the sum of the number of carbon atoms in the group or in the groups R being 6–30, $R_1$ is an aromatic group containing at least 2 aromatic rings and 10–20 carbon atoms, and M in a preferably monovalent cation or hydrogen. The group $R_1$ usually contains only carbon and hydrogen, but alto oxygen atoms may be included, for instance in the form of ketone groups. Besides having an air-entraining capacity, these compounds yield a hydrophobic aerated concrete which has low viscosity and is easily pumpable.

The disulphonates of formula I suitably consist of compounds where R is an aliphatic group having 6–14 carbon atom and $R_1$ is an aromatic group having 10–17 carbon atoms and two aromatic rings. Examples of such disulphonates are those having the following formulae

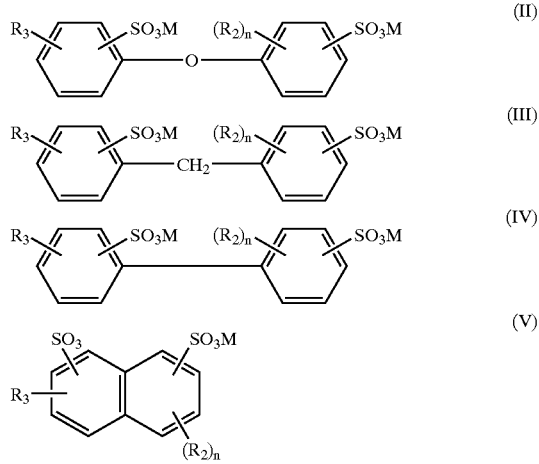

wherein $R_3$ is an aliphatic group having 4–20 carbon atoms, M has the above meaning, $R_2$ is an aliphatic group having 1–14 carbon atoms and n is 0 or 1, preferably 0. The groups $R_3$ and $R_2$ are, for instance, a butyl group, a hexyl group, an octyl group, a decyl group or a dodecyl group, which can be straight or branched. Thee group $R_2$ can also suitably be a lower alkyl group, such as a methyl or ethyl group. The sum of the number of carbon atoms in the groups $R_3$ and $R_2$ is preferably 8–24. These disulphonates result in a stable, low-viscous aerated concrete which can easily be pumped. Particularly preferred are alkyl-substituted diphenyl ethers.

The fine-particulate material is e.g. fly ash, bentanite (myanite), rock dust, finely-ground lime, gypsum and silica having a particle size which is smaller than that of the cement. It should suitably have a particle size which to at least 95% is below 5 $\mu$m and a specific surface in the order of at least 1,500 m²/kg or higher. Silica having a particle size of 0.1 $\mu$m and a specific surface of $2 \cdot 10^4$ is an example of a fine-particulate material having a good penetration capacity. Fly ash, lime and silica also affect the setting of the concrete.

The resins, which can be synthetic or natural, or derivatives thereof are primarily added to increase the strength, water-repelling properties (hydrophobicity) and homogeneity of the concrete. The resins and their derivatives may contain one or more aromatic and/or aliphatic groups having at least 12, preferably 16–35 carbon atoms. The groups can be saturated as well as unsaturated. Preferred resins are those having an acid number from 4 to 170 and a saponification rate from 150 to 175. Examples of suitable resins are different colopholic acids and mixtures thereof, such as colophonium, and their dimarised derivatives as well as wholly or partly saponified, esterified and/or hydrated derivatives thereof. Examples of suitable hydroxyl compounds for esterification are methanol, glycol, glycerol and pentaerythrital. Other examples are modified colophonium resins modified with unsaturated fatty acids, such as maleic acid and their preferably partially esterified derivatives as well as phenol-modified colophonium. Examples of suitable phenols are 4-tert-butyl phenol, nonyl phenol and 4,4'-diphenylolpropane (bisphenol A).

Other examples of additives are retarders or accelerators, which control the hydration of the cement, thereby adjusting it to the conditions prevailing in injection and raking it occur at the desired point of time. Examples of accelerators are alkali salts, such as calcium chloride, sodium hydroxide, potassium carbamide and sodium aluminate, while examples of retarders are saccharides, phosphates, citric acid and lignosulphonate. The latter also has a pronounced dispersing effect. Also the addition of a thickening agent, which gradually develops its viscosity, may serve to prevent the aerated concrete from being flushed away by penetrating water before it has cured. Examples of such thickening agents are saccharide compounds, such as nonionic cellulose ethers, polyurethanes and polyacrylates. Examples of suitable cellulose ethers are hydroxyethyl-cellulose, methylcellulose, methylzydroxyethylcellulose and ethylhydroxyethylcellulose.

Swelling additives are admixed to counteract volume reduction and thus prevent cracks and cavities from being incompletely filled. An example of swelling additives is aluminium powder.

When injecting aerated concrete it is most important for it to be stable. Should the mixture not be stable, the individual cement particles will settle owing to their dead weight and thus block and prevent further injection into, for instance, a system of cracks in a rock. The fine-particulate material having a large specific surface, such as silica, qypsum and myanite, increases the stability of the aerated concrete and can thus be carried by the aerated concrete up to the cracks in the rock. Using aerated concrete having a high content of moisture gives a low-viscous concrete with low shear strength. This fact and also the fact that the air bubbles carry the particles on their surfaces contribute to low viscosity of the fresh concrete and imply that the concrete can be injected at a low pump pressure but still obtain good penetration. The low pump pressure that is necessary for injecting the aerated concrete also gives the advantage of lower demands on the anchoring of adapters in bore holes. Moreover, the safety for staff handling the equipment can be increased, and the risks of tubes breaking and adapters releasing their hold can practically be eliminated.

FIG. 1 shows the penetrating of the concrete 1 having a high moisture content into a crack 2 in a rock or the like. The arrow 3 indicates the direction of flow of the concrete, the air bubbles in the concrete being designated 4.

As mentioned above, the concrete 1 is pumped preferably through a tube and/or bore hole up to the crack 2 of the rock, the pump pressure being kept at a low level. As also mentioned above, the air bubbles 4 carry cement and other particles of material in an effective way up to and into the crack. Then the pressure in the tube is increased considerably, which means that the air bubbles in the crack collapse and an air flow transport of particles and water into the interior of the crack arises. This means that the cement particles agglomerate well into the crack and cure to a high density concrete, thereby sealing the crack.

According to the invention, the aqueous concrete mixture can be made by mixing water, including a dispersing agent and other organic additives which are soluble or dispersible in water, with dry mortar containing, among other things, cement and optionally a fine-particulate material, to a homogeneous slurry.

Another technique is to combine, during stirring, a main mixture containing the greater part of cement, the greater part of water and fine-particulate material, and a supplementary mixture containing the remaining water, the remaining cement, the dispersing agent and optionally resin and other organic additives. The weight ratio of main mixture to supplementary mixture is usually in the range 20:1 to 2:1.

A further technique of manufacturing the aerated concrete is to supply to a discontinuous or continuous mixer water, the dispersing agent and optionally resin and other organic additives as well as a small amount of cement, usually 2–40, preferably 5–30% by weight of the total amount of cement (suitably in the stated order). The resulting composition is stirred while increasing in volume to a homogeneous, stable air-containing concrete mixture, whereupon the remaining cement and the fine-particulate material are added in one or more steps or continuously and are mixed while being stirred.

The present invention is further illustrated by the following Examples.

Example 1

A house with a concrete base built on a foundation of sand and stone and subjected to proceeding settlement, was stabilized with aerated concrete according to the invention. The aerated concrete, which had a density of 495 kg/m and an air pore volume of 69%, was based on Portland cement with such a particle size as to allow above 93% by weight to pass a screen with a mesh size of 32 mm and also contained per 100 parts by weight of cement 0.7 parts by weight of decyl-substituted diphenylether disulphonate of formula II and 0.35 parts by weight of Aquatac 6085, a glycerol resin acid ester with an active content of 59% by weight supplied by Bergvik Kemi AB.

The injection tubes were buried at a depth of 100 cm, and the aerated concrete was injected at a pressure of 1 bar, and when it was no longer possible to inject aerated concrete at this pressure, the pressure was increased to 10 bar, whereupon curing took place.

After injection, the settlement ceased and the injected aerated concrete was inspected by digging up the material round the injection tubes. The aerated concrete between stone and gravel had the expected air pore volume, whereas the aerated concrete that had been pressed into narrow spaces and cracks had no air pore volume or a very low such volume.

What is claimed is:

1. A method for stabilizing gravel, sand, crushed stone, rock and, concrete structures which are cracked, porous or have other cavities difficult of access and sealing the same against flows of water which comprises the steps of: A) injecting a pumpable, low-viscous aqueous aerated concrete with a pore volume of at least 20% by volume into the cavities that are difficult of access and are to be sealed, said aerated concrete being first injected at a low pressure whereby the aerated concrete remains intact, and B) exerting the aerated concrete to an increased pressure, whereby the aerated concrete located in or in the vicinity of the cavities is pressed further into the cavities, said aqueous aerated concrete comprising finely-ground cement, a dispersing agent and optionally fine-particulate material having a large specific surface, and that, in the aerated concrete, existing air bubbles collapse when the aerated concrete is pressed further into the cavities such that air escaping from the air bubbles entrains the cement and fine particulate material, into the cavities, to thereby cause sedimentation and hydration to take place.

2. The method according to claim 1 wherein the aerated concrete has an air pore volume of 40–85%, is hydrophobic and is not spontaneously miscible with water.

3. The method according to claim 1 wherein the aerated concrete contains an anionic surfactant of the general formula

$$(R)_m-R_1-(SO_3M)_2 \qquad (1)$$

wherein R is an aliphatic group having 4–20 carbon atoms, m is the number 1 or 2, the sum of the number of carbon atoms in the 1 or 2 R groups being 6–30, $R_1$ is an aromatic group containing at least 2 aromatic rings and 10–20 carbon atoms, and M is a monovalent cation or hydrogen.

4. The method according to claim 1 wherein the aerated concrete contains an accelerator, retarder or thickening agent.

5. The method according to claim 1 wherein the injection of the concrete occurs at a pressure below 3 bar, and that the pressure is then increased to at least 6 bar.

6. Aerated hydrophobic concrete which is not spontanously miscible with water having a pore volume of at least 20% and contains finely-ground cement with a particle distribution whereby at least 95% pass a screen with a mesh size of 64 βm, 2–10% based on the weight of the cement, of a fine-particulate material with a particle size smaller than that of the cement, hydrophobizing a resin and a dispersing agent, which is air-pore forming, in an amount sufficient to produce a pore volume of at least 20%.

7. The aerated cement concrete according to claim 6, characterized in that it has comprising an air pore volume of at least 40–85% and contains 0.1–1 parts by weight of a dispersing agent, 35–80 parts by weight of water, 2–10 percent by weight of a fine-particulate material with a particle size smaller than that of the cement, 0–2.5 parts by weight of the resin having a molecular weight below 10,000, 0–2.5 parts by weight of an accelerator, retarder and/or thickening agent which control the hydration of the cement or gradually increase the viscosity of the concrete, and 0–2 parts by weight of a swelling additive per 100 parts by weight of cement.

8. The aerated concrete according to claim 7, wherein the dispersing agent contains a disulphonate of the general formula

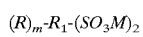 (I)

wherein R is an aliphatic group having 4–20 carbon atoms, m is a number 1 or 2, the sum of the number of carbon atoms in the 1 or 2 R groups being 6–30, $R_1$ is an aromatic group containing at least 2 aromatic rings and 10–20 carbon atoms, and M is a monivalent cation or hydrogen.

9. The aerated concrete according to claim 7 which comprises 0.1–2.5 parts by weight of the resin.

10. The aerated concrete according to claim 7 comprising 2–10% by weight of fine- particulate material and said cement having a particle size whereby 95% by weight pass a screen with a mesh size of 32 um.

* * * * *